United States Patent [19]

Karakane et al.

[11] Patent Number: 5,099,995
[45] Date of Patent: Mar. 31, 1992

[54] DISC HOUSING CASE

[75] Inventors: Toshio Karakane, Kodaira; Fujio Nagai, Akikawa; Hikaru Igarashi, Mitaka; Akio Takeda, Hino; Hisashi Kuma, Tokyo, all of Japan

[73] Assignee: TEAC Corporation, Japan

[21] Appl. No.: 737,835

[22] Filed: Jul. 29, 1991

Related U.S. Application Data

[63] Continuation of Ser. No. 435,042, Nov. 9, 1989, abandoned.

[30] Foreign Application Priority Data

Nov. 14, 1988 [JP] Japan .............................. 63-287256
Oct. 13, 1989 [JP] Japan .............................. 63-119234[U]

[51] Int. Cl.⁵ .............................................. B65D 85/30
[52] U.S. Cl. .................................. 206/444; 206/309; 206/311; 206/312; 206/425; 312/11
[58] Field of Search ............... 206/310, 311, 312, 444, 206/425, 309; 312/11; 220/23.2, 23.4, 23.8; 211/40

[56] References Cited

U.S. PATENT DOCUMENTS

| 1,098,154 | 5/1914 | Housh | 206/311 |
|---|---|---|---|
| 1,992,630 | 2/1935 | Piperoux | 206/373 |
| 2,904,900 | 9/1959 | Kramer | 206/472 |
| 4,549,658 | 10/1985 | Sfikas | 206/312 |
| 4,776,463 | 10/1988 | Press | 206/312 |
| 4,778,047 | 10/1988 | Lay | 206/425 |
| 4,819,799 | 4/1989 | Nomula et al. | 206/387 |
| 4,844,260 | 7/1989 | Jaw | 206/444 |
| 4,871,218 | 10/1989 | Swinson | 206/425 |
| 4,875,743 | 10/1989 | Gelardi et al. | 211/40 |
| 4,911,301 | 3/1990 | Diefenbach | 206/444 |

FOREIGN PATENT DOCUMENTS

| 112036 | 10/1988 | China . | |
| 117473 | 8/1989 | China . | |
| 136228 | 6/1990 | China . | |
| 980193 | 5/1951 | France | 206/311 |
| 206978 | 9/1986 | Japan | 206/444 |
| 62-52180 | 4/1987 | Japan . | |
| 63-2292 | 1/1988 | Japan . | |

Primary Examiner—David T. Fidei
Attorney, Agent, or Firm—Andrus, Sceales, Starke & Sawall

[57] ABSTRACT

A disc holder comprises a base member having an engagement portion and a flexible sheet, the base member and the flexible sheet forming a pocket holding an information recording disc. A housing case body comprises a housing member housing the disc holder and a mounting member with which the engagement portion of the disc holder housed by the housing member engages. A disc housing case combines the disc holder and the housing case body.

11 Claims, 10 Drawing Sheets

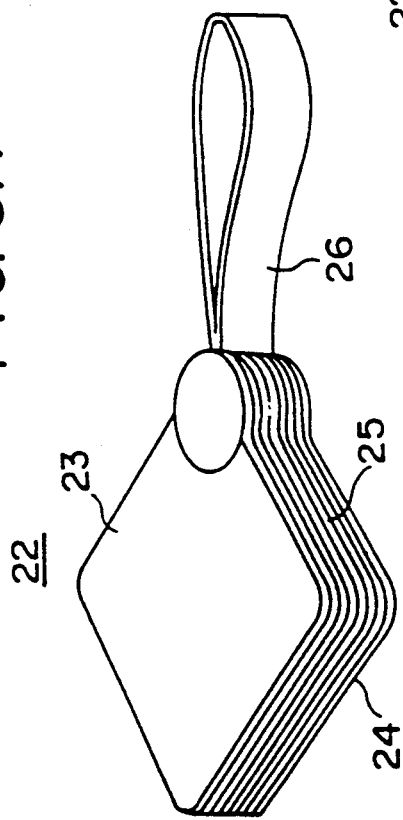
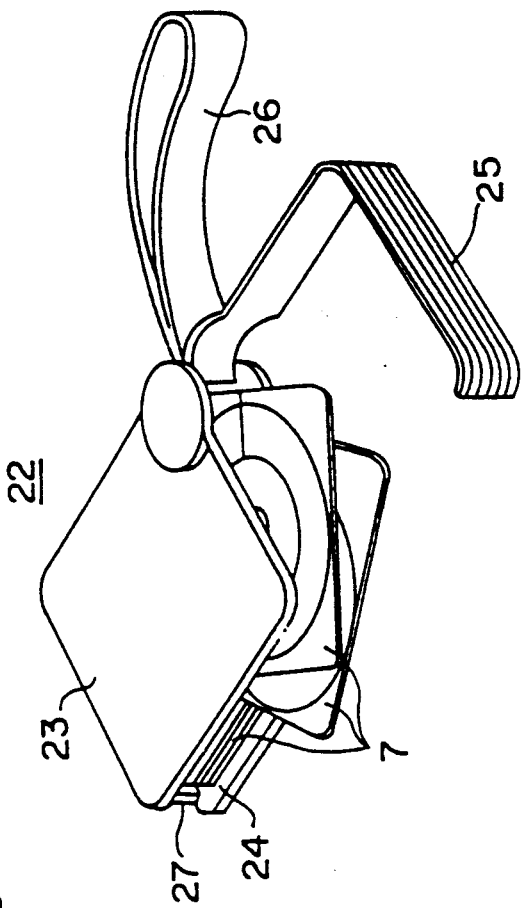

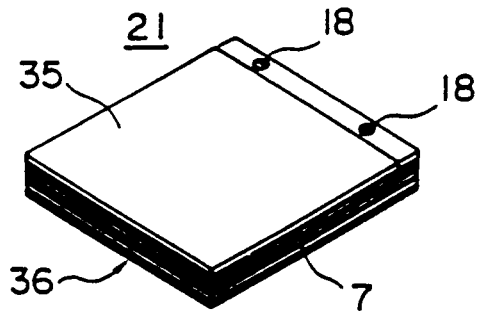
FIG. 7A
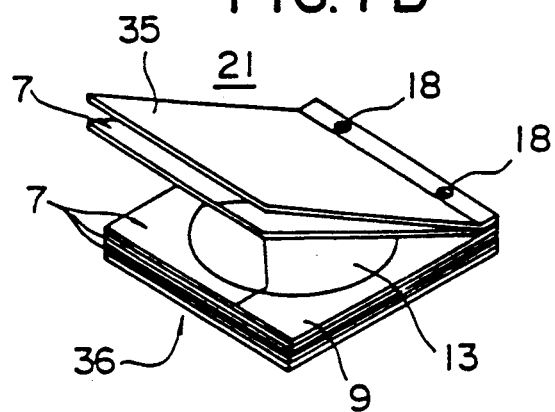
FIG. 7B
FIG. 8
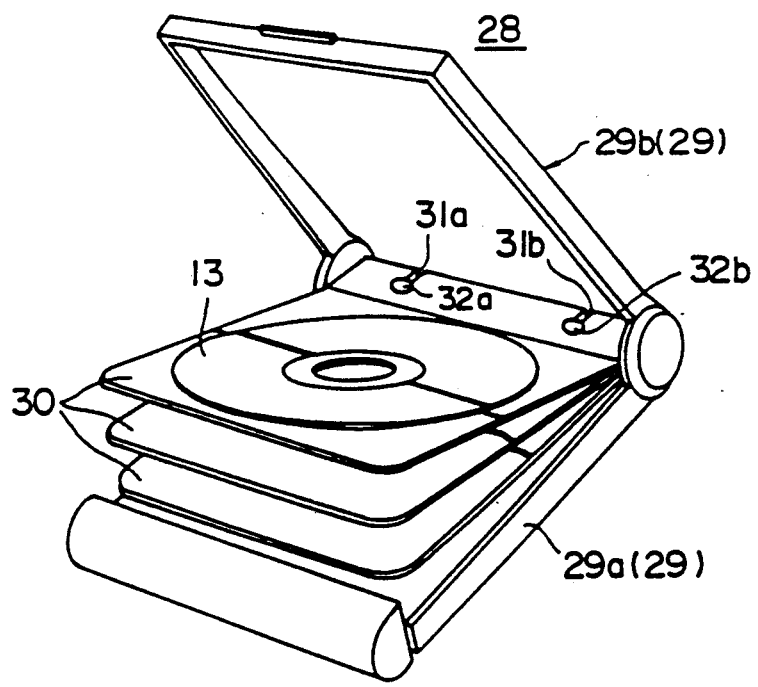

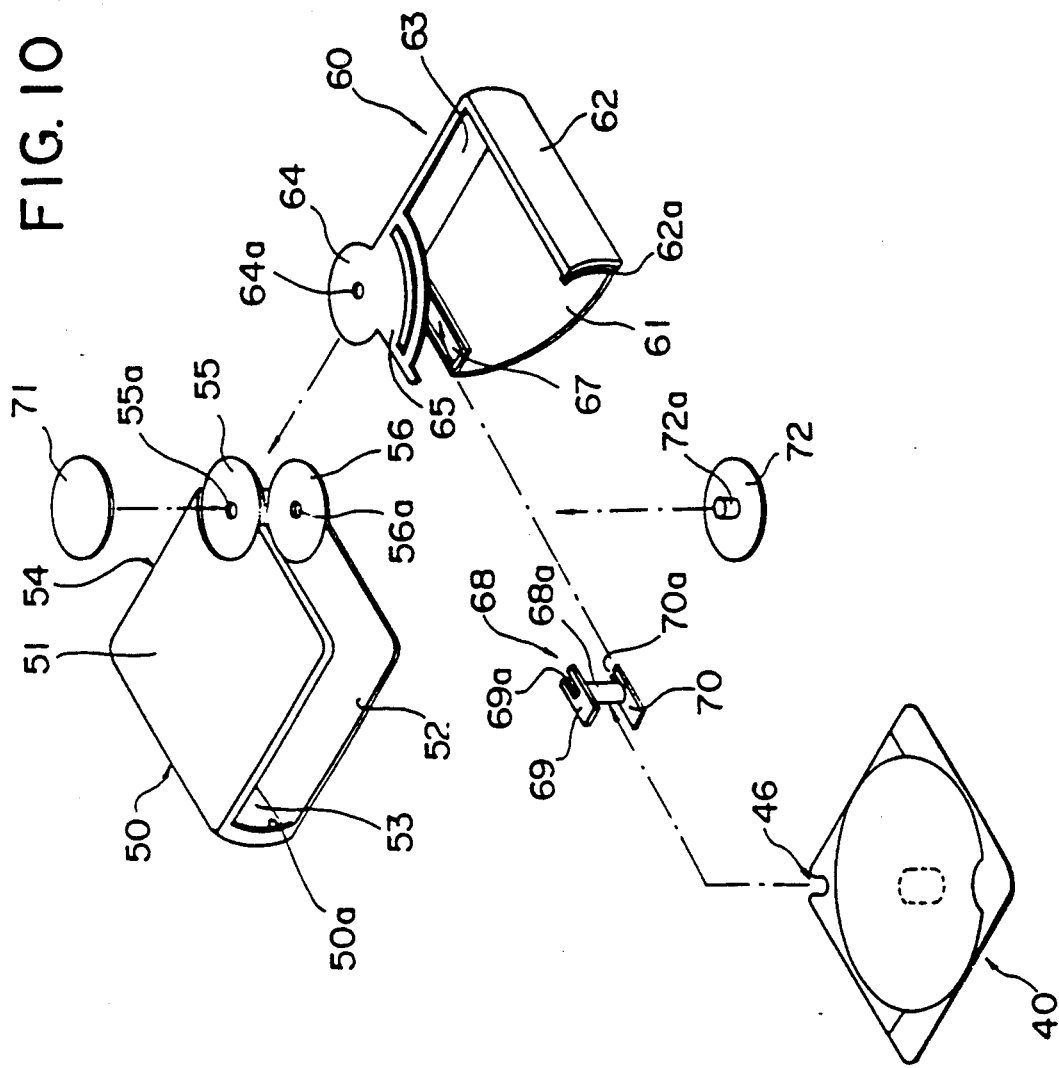

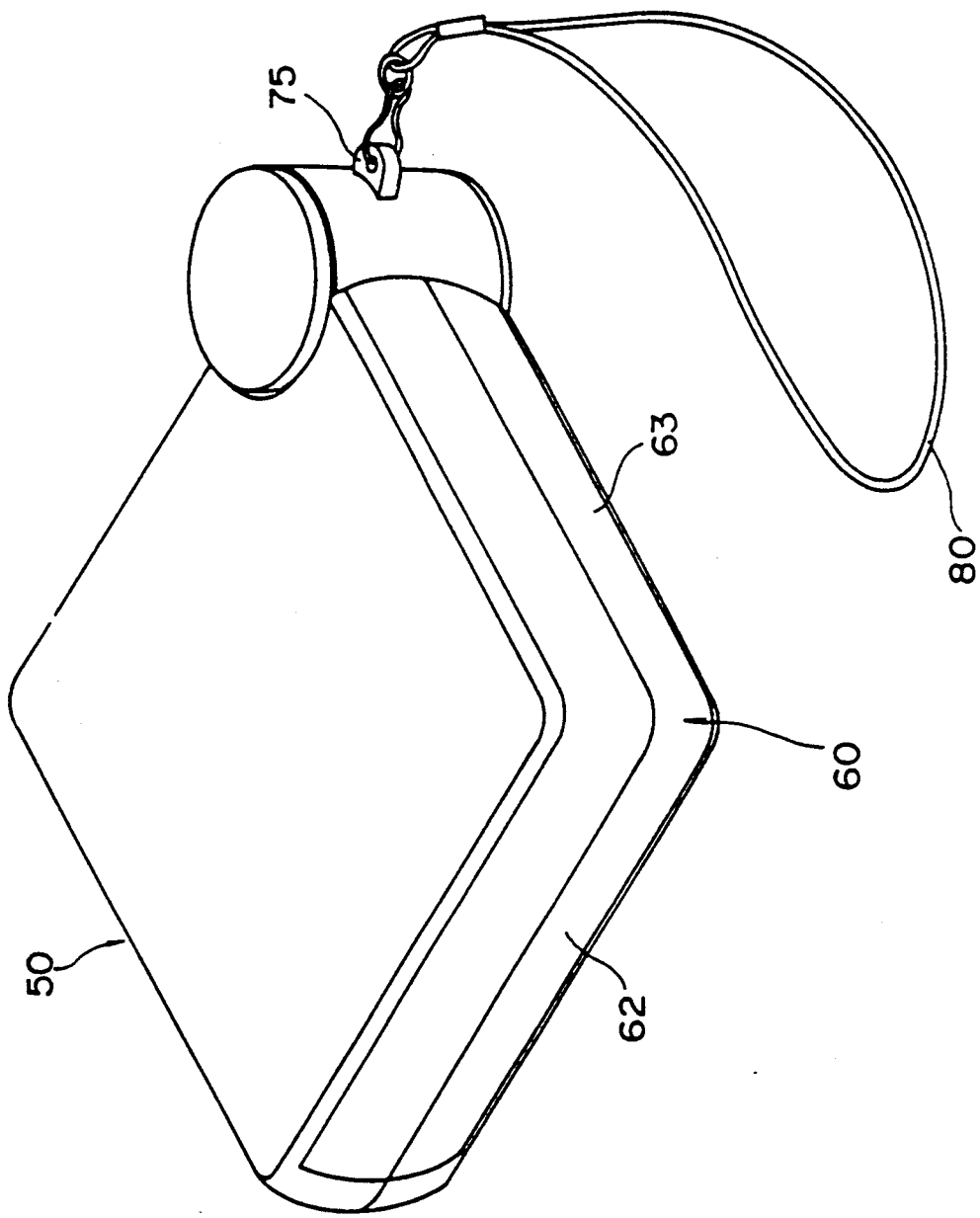

DISC HOUSING CASE

The present application is a continuation application of U.S. patent application Ser. No. 07/435,042, filed Nov. 9, 1989, and now abandoned.

BACKGROUND OF THE INVENTION

The present invention relates to a disc holder for housing and carrying an information-recording disc such as compact disc (CD) and the like, and more particularly to a housing case body for housing disc holders, and a disc housing case which combines the disc holders and the housing case body.

So as to protect it from dust and the like, the compact disc is generally stored in a disc housing case. FIG. 1A and FIG. 1B illustrate one example of this type of disc housing case which has been conventionally used. The disc housing case 1 comprises a case body 2 and a cover 3 made of resin. A central hole 13a of a disc 13 is clamped by a clamp portion 2a of the case body 2. And closing the cover, the disc housing case holds and protects the disc 13 in an approximately airtight state.

However, there has been a recent spread of portable players and automobile players designed for compact discs and this has led to an increase in the number of occasions when a number of compact discs are carried. When a large number of compact discs are carried, the combined volume of the disc housing case 1 shown in FIG. 1A and FIG. 1B becomes large. Because of this, a disc housing case having a structure wherein it is provided with a plural number of storage trays having pocket portions housing compact discs is proposed so that a large number of compact discs can be carried conveniently.

As has been described above, conventional disc housing cases (refer to FIG. 1A and FIG. 1B) include those that are designed mainly for the objective of storage and some that are designed for carrying. Accordingly, when stored compact discs are to be carried, it is necessary to take the appropriate discs out of their disc housing cases suited to storage and transfer them to a disc housing case suitable for carrying the selected compact discs. In addition, when the compact discs that have been carried are to be stored again, it is necessary to take the discs out of the disc housing case suitable for carrying, and transfer the carried discs into the disc housing cases suitable for storage.

In this way, conventional disc housing cases involve the task of transferring the compact discs from one case to another when stored compact discs are to be carried, or when carried compact discs are to be stored. When compact discs are repeatedly stored and carried, it is necessary to take care with respect to the attachment of dust and other foreign matter and thus the task of transferring the compact discs becomes laborious.

SUMMARY OF THE INVENTION

Accordingly, it is a general object of the present invention to provide a novel and useful disc holder, housing case body, and disc housing case, in which the problems described heretofore are eliminated.

It is also an additional object of the present invention to provide a disc holder suitable for a storage and a carrying of an information recording disc.

The above object can be achieved by a disc holder, comprising a base member having an engagement portion in engagement with a mounting member to which the disc holder is attached, and a flexible sheet partially affixed to the base member, the base member and the flexible sheet forming a pocket having an opening, the pocket holding an information recording disc inserted therein through the opening, the engagement portion formed on an outer edge of the base member and at a position other than a position which faces the opening of the pocket.

Another object of the present invention is to provide a housing case body for housing a disc holder that is suitable for a storage of a information recording disc.

The above object can be achieved by a housing case body for housing a disc holder having a base member and a flexible sheet forming a pocket for holding an information recording disc, comprises a housing portion housing the disc holder, and a holding member holding the disc holder housed in the housing portion.

In addition, another object of the present invention is to provide a housing case body for housing a disc holder that is suitable for a carrying of a information recording disc.

The above object can be achieved by a housing case body for housing a disc holder having a base member having an engagement portion, a flexible sheet forming a pocket together with the base member, comprises a housing member housing the disc holder, and a mounting member with which the engagement portion of the disc holder housed by the housing member engages.

Moreover, in addition, another object of the present invention is to provide a disc housing case, in particular, which is suitable for a storage of an information recording disc.

The above object can be achieved by a disc housing case, comprises a disc holder having a base member and a flexible sheet partially affixed to the base member, the base member and the flexible sheet forming a pocket having an opening, the pocket holding an information recording disc inserted therein through the opening, and a housing case body having a housing portion housing the disc holder, and holding member holding the disc holder housed in the housing portion.

In addition, it is another object of the invention to provide a disc housing case, in particular, which is suitable for a carrying of an information recording disc.

The above object can be achieved by a disc housing case, comprises a disc holder including a base member having an engagement portion and a flexible sheet partially affixed to the base member, the base member and the flexible sheet forming a pocket having an opening, the pocket holding an information recording disc inserted therein through the opening, the engagement portion formed on an outer edge of the base member and at a position other than a position which faces opening the opening of the pocket, and a housing case body having a housing member housing the disc holder, and a mounting member with which the engagement portion of the disc holder housed by the housing member detachable engages.

BRIEF DESCRIPTION OF THE DRAWINGS

FIG. 6A and FIG. 6B are perspective views indicating alternative forms of the disc housing case of FIG. 3A and FIG. 3B.

FIG. 7A and FIG. 7B are perspective views indicating a third embodiment of the disc housing case according to the present invention.

FIG. 8 is a perspective view indicating alternative forms of the third embodiment of the disc housing case according to the present invention.

FIG. 10 is a assembly perspective view indicating an alternative example of the disc housing case according to the present invention.

FIG. 11A and FIG. 11B is a completed assembly view of the disc housing case according to the present invention.

DESCRIPTION OF THE PREFERRED EMBODIMENTS

Figure 1B:
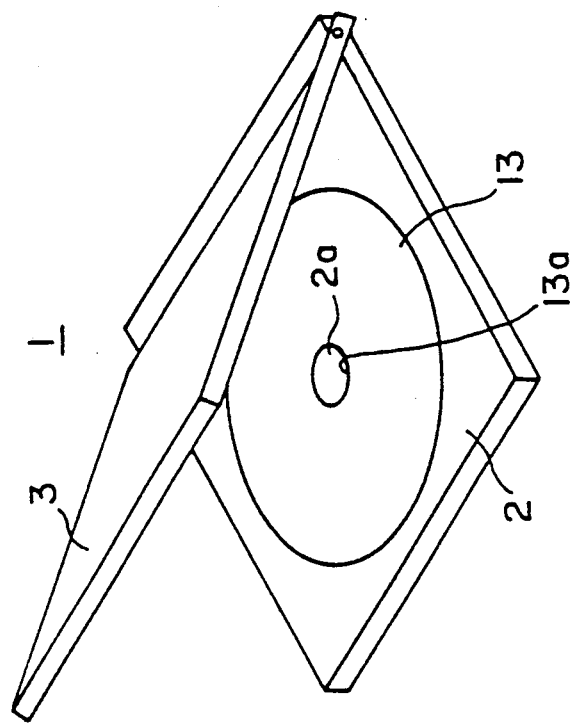
FIG. 1A and FIG. 1B are view of one example of a conventional disc housing case.
Figure 1A:
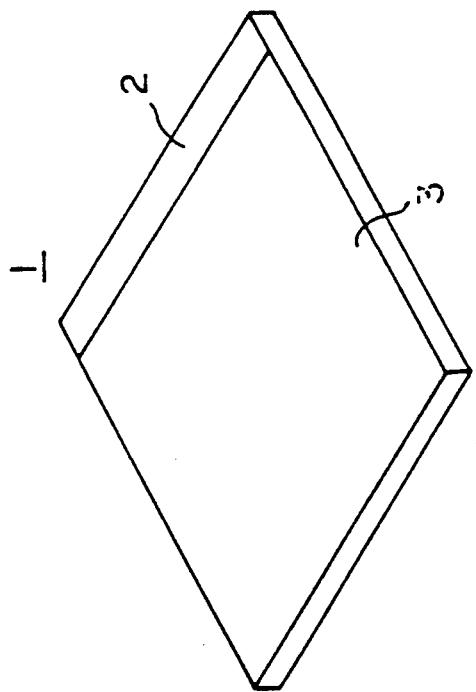
Figure 2:
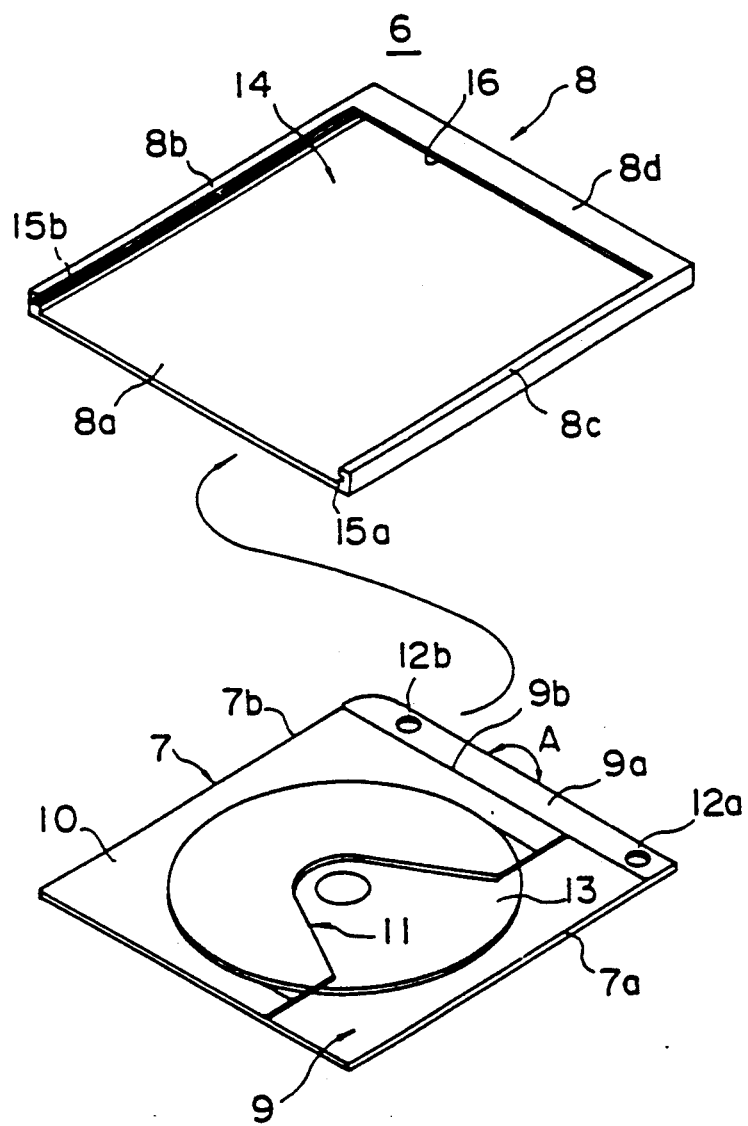
FIG. 2 is a perspective view indicating a first embodiment of the disc housing case according to the present invention.

FIG. 2 is a perspective view indicating a first embodiment of the disc housing case according to the present invention.

The disc housing case 6 comprises a disc holder 7 and a housing case body 8. The disc holder 7 includes a base member 9 formed of a thin sheet of resin, and a sheet member 10 formed of resin. With the exception of one of the edges of this sheet member 10, the edge portion of this sheet member 10 is affixed by thermal adhesion or the like to the base member 9 so as to form a pocket 11. The sheet member 10 and the base member 9 are adhered so as to form a circular line along the edge of the join, so that the edge of a disc 13 housed in the pocket 11 is in contact along its edge with this join and so that the disc 13 is securely housed in the pocket 11 without deformation of the disc 13 in the pocket 11 occurring. The base member 9 is rectangular in shape and has a structure whereby the edge on one side 9a can be arbitrarily bent in the direction of the arrow A. The edge on one side 9a of this base member 9 has two holes 12a and 12b formed along this one side of the base member 9.

When the disc 13 is housed in the pocket 11 formed in the disc holder 7, the greater portion of the disc 13 is covered by the base member 9 and the sheet member 10. By this, the adhesion of dust or grime to the disc 13 is prevented.

The housing case body 8 includes a rectangular-shaped plate 8a, on both sides of which are formed flange portions 8b and 8c, and a flange portion 8c formed on the bottom edge.

In a housing case body 8 having the structure described above, the surface of the plate 8a is surrounded by the flange portions 8a, 8b and 8c to form a housing portion 14. The disc holder 7 is housed in this housing portion 14. Guide grooves 15a and 15b are formed on the inside of each of the flange portions 8b and 8c and on the inside of the flange portion 8d is formed a stop groove 16. The flange portions 8b and 8c are formed in a C-shape in section by the guide grooves 15a and 15b. The guide grooves 15a and 15b are formed so that they engage with the outer peripheral portion 7a and 7b of the disc holder 7.

The disc holder 7 is housed in the housing case body 8 in the following manner.

First of all, as is indicated by the arrow in the diagram, the leading end portion of the side edges 7a and 7b is inserted into the guide grooves 15a and 15b from the side of the open end that does not have a flange portion formed in the plate 8a, and the side edges 7a and 7b are guided along the guide grooves 15a and 15b so as to slide. Then, the leading edge portion (the one edge portion 9a) of the disc holder 7 engages with the stop groove 16 of the flange portion 8d. In this status, the disc holder 7 is housed in the housing portion 14 of the housing case body 8 and the outer peripheral portion of the disc holder 7 is guided and held by the guide grooves 15a and 15b and the stop groove 16. Accordingly, the disc holder 7 is securely housed in the housing case body 8.

The disc holder 7 and the housing case body 8 form the one case and so the disc 13 housed in the disc holder 7 is securely stored.

The disc housing case 6 comprising the disc holder 7 and housing case body 8 described above has a structure that is particularly suited to housing a single disc 13. However, if each of the flanges of the housing case body 8 are formed higher and the number of grooves increased, then it is possible to house several disc holders 7 (i.e. several discs 13).

FIG. 3A, FIG. 3B, FIG. 4 and FIG. 5 are perspective views indicating a disc housing case 17 according to a second embodiment of the present invention.

Figure 3A:
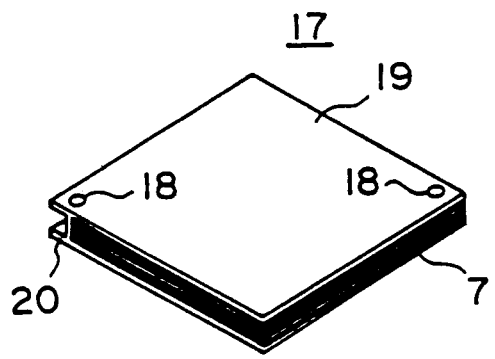
FIG. 3A and FIG. 3B are perspective views indicating a second embodiment of the disc housing case according to the present invention.
Figure 3B:
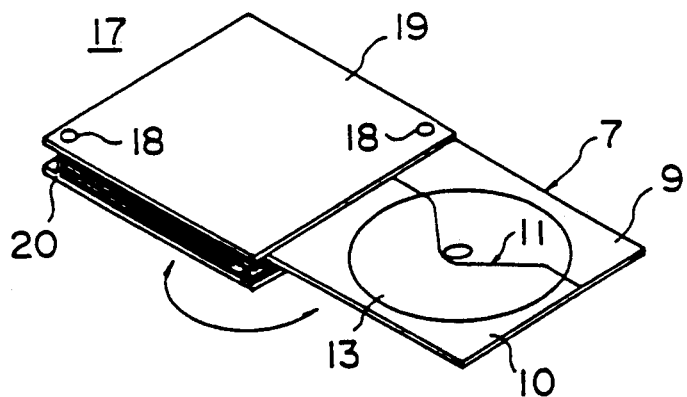
Figure 4:
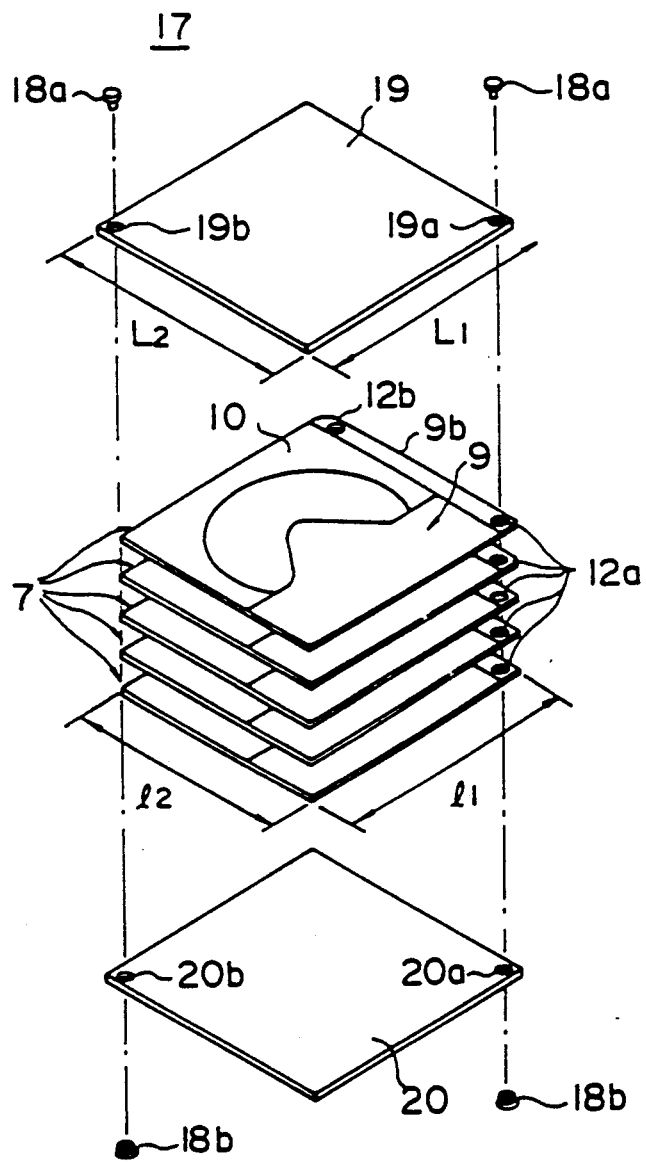
FIG. 4 is an exploded view indicating a disc housing case related to the second embodiment described above.

In particular, FIG. 3A and FIG. 3B indicated the completed status of the disc housing case 17 and FIG. 4 indicates the assembly status of the disc housing case 17.

In this embodiment, the disc holder 7 that directly houses the disc 13 has the same structure as that described for the first embodiment according to the present invention and as has been described previously (refer to FIG. 2). This disc housing case 17 can house a plural number of disc holder 7 and therefore has a structure whereby a plural number of discs 13 can be carried at the same time.

In this case, the housing case body housing the disc holder 7 includes a rectangularly-shaped upper plate cover 19, a lower plate cover 20 having the same shape, and linkage pins 18 and 18 linking them.

Figure 5:
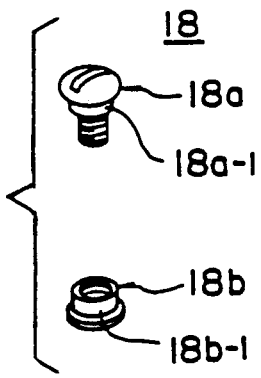
FIG. 5 is a perspective view indicating the specific structure of an engagement pin.

The linkage pins 18 and 18 have the structure indicated in FIG. 5. This is to say that the linkage pins 18 and 18 comprise a male thread portion 18a and a female thread portion 18b and each of the male thread portion 18a and the female thread portion 18b has a pin portion 18a-1 and 18b-1. By this, when each of the male thread portions 18a and female thread portions 18b are in the threaded status, the head of each screw is separated by a distance corresponding to the lengths of the pin portions 18a-1 and 18b-1, and thereby form the linkage pins 18 and 18.

The upper plate cover 19 and the lower plate cover 20 are formed of resin sheet and so as indicated in FIG. 4, pairs of holes 19a and 19b, and 20a and 20b are formed at positions in opposite corners. The length $L_1$ of one side of this upper plate cover 19 and lower plate cover 20 is set to be equal to the length $l_1$ of one side of the disc holder 7 (i.e. $L_1 = l_1$) and the length $L_2$ of the other sides of the upper plate cover 19 and the lower plate cover 20 are set so as to be longer than the length $l_2$ of the other sides corresponding to the disc holder 7 (i.e. $L_2 > l_2$).

A plural number of disc holders 7 can be housed in the space between the upper plate cover 19 and the lower plate cover 20. More specifically, as is shown in FIG. 4, the disc holders 7 in the stacked state are sandwiched between the upper plate cover 19 and the lower plate cover 20. The length of one side $L_1$ of the upper plate cover 19 and the lower plate cover 20 is equal to the length $l_1$ of one side of the disc holder 7 and so the hole 12a in each of the disc holders 7 is in alignment with the holes 19a and 20a in the upper plate cover 19 and the lower plate cover 20. Then the male thread portion 18a and the female thread portion 18b are passed through the holes 19a, 12a and 20a and screwed together. The upper plate cover 19 and the lower plate cover 20 are linked at one end and a plural number of disc holders 7 can be mounted to the linkage pin 18. This linkage pin 18 functions as a mounting member for the disc holders 7. In addition, the length $L_2$ of the other sides of the upper plate cover 19 and the lower plate cover 20 are longer than the lengths $l_2$ of the other sides of the disc holder 7 and so the male thread portion 18a and female thread portion 18b are passed through the other holes 19b and 20b of the upper plate cover 19 and the lower plate cover 20 and threaded to each other so as to link the upper plate cover 19 and the lower plate cover 20 at the appropriate end portions.

As has been described above, the assembly of the disc housing case 17 having the upper plate cover 19, the lower plate cover 20 and the disc holder 7 involves only passing the linkage pins 18 and 18 through the hole 12a formed in the disc holder 7, the pairs of holes 19a and 19b, and 20a and 20b formed in the upper plate cover 19 and the lower plate cover 20. The assembly is therefore simple.

In addition, transferring discs 13 stored in the disc housing case 6 shown in FIG. 2 to the disc housing case 17 is performed by transferring the disc holder 7 housing the disc 13. Accordingly, when discs 13 are transferred from disc housing case 6 suited to the storage of compact discs to a disc housing case 17 suited to the carrying of compact discs, it is not necessary to remove the discs from the disc housing cases. Therefore, the task of transferring the discs is facilitated and the adhesion of dust and the like to the compact discs is prevented.

FIG. 3A shows the status where a plural number of compact discs is housed in the space between the upper plate cover 19 and the lower plate cover 20. In this status, taking out the discs 13 is performed as shown in FIG. 3B by pivoting the disc holders 7 housing the necessary discs 13 about the center of the linkage pin 18, so that disc holder 7 is exposed from the space between the upper plate cover 19 and the lower plate cover 20.

Moreover, in this second embodiment according to the present invention, only a single hole need be formed in the disc housing case 17 for the linkage pin 18 to pass.

FIG. 6 shows an alternative embodiment of the disc housing case 17 indicated in FIG. 3A through FIG. 5.

The disc housing case 22 indicated in FIG. 6A and FIG. 6B has a structure whereby a plural number of disc holders 7 are housed in a case that includes cover plates 23 and 24 opposing each other by a predetermined distance. The case is provided with a lid 25. Each of the disc holders 7 is held within the case by a pin (not shown in the figure) provided in the case, being inserted into a hole 12a in the same manner as indicated in FIG. 3A and FIG. 3B. The lid 25 can pivot around the center of the open end of the case and the lid 25 can be pivoted to open and close the case. When the lid 25 is opened, the disc holders 7 can be pivoted about the pin and brought out of the case, and the discs 13 can be housed in or taken out from the corresponding disc holders 7.

In this alternative embodiment, a lid 25 is provided on a case including covers 23 and 24 so that the intrusion of dust into the disc housing cases 22 can be definitely prevented. When the lid 25 is closed, a hook portion (not indicated in the figures) formed at the end of the lid 25 engages with a stopper 27 on the case side so that the lid 25 is locked. By this, the lid 25 does not open easily when the disc housing case is being carried, and the disc holders 7 are definitely prevented from falling out.

Moreover, the disc housing case 22 is provided with a belt 26 to facilitate the carrying of the disc housing case 22 and make it easier to use. FIG. 7A and FIG. 7B are perspective views indicating a third embodiment of a disc housing case 21 according to the present invention. In this embodiment, the disc holder 7 directly housing the disc 13 has a structure similar to that which has been explained previously for the first embodiment and the second embodiment (refer to FIG. 2). The disc housing case 21 is the same as for the first embodiment and the second embodiment in that it is structured so that a plural number of disc holders 7 are sandwiched between an upper plate cover 35 and a lower plate cover 36.

In particular, the upper plate cover 35 has one edge portion that can be arbitrarily bent as is the disc holder 7, and is formed with two holes at positions the same as the holes two holes 12a and 12b provided in the disc holder 7. In addition, the one side portion of the lower plate cover 36 is provided with two holes in the same manner. Thus, A plural number of disc holders 7 are sandwiched between the upper plate cover 35 and the lower plate cover 36, the two linkage pins 18 and 18 are passed through each of the holes and the upper plate cover 35 and the lower plate cover 36 and the disc holder 7 form a single unit. In this case, the two linkage pins 18 and 18 function as mounting members for the disc holders 17.

In a disc housing case 21 having the structure as described above, the upper plate cover 35 and one side of each of the disc holders 7 are able to bend arbitrarily so that the disc holders 7 can be turned over like the pages of a book so that the disc holders 7 can be looked at in sequence from the upper plate cover 35. Thus, the discs 13 are either taken out from the disc holders 7 that have been turned over, or are stored to the appropriate disc holder 7. Accordingly, the disc housing case 21 facilitates the housing of discs 13 into the disc housing case 21 and also facilitates their being taken out from the disc housing case 21.

FIG. 8 indicates an alternative embodiment of the disc housing case 21 indicated in FIG. 7A and FIG. 7B above.

The disc housing case 28 indicated in FIG. 8 includes a lid 29b and a receiving portion 29a forming the housing case body, and one side of the receiving portion 29a is (hinge) engaged to the lid 29b so as to be arbitrarily pivotable with respect to it. In the receiving portion 29a, there are mounting pins 32a and 32b provided close to the engagement with the lid. These mounting pins 32a and 32b have axial portions with diameters smaller than the diameters of the tip end portions. The receiving portion 29a and the lid 29b forming the housing case body as described above are formed of a hard resin. In other words, the housing case body is a hard case. In addition, the disc holder 30 that is another element that configures this disc housing case 28 is substantially similar to it indicated in FIG. 2. But the engagement portion that engages the mounting pins 32a and 32b provided on the receiving portion 29a described above communicates with the holes and the exterior of the base member. This is to say that two engaging concave portions 31a and 31b form a substantially U-shape portion in one side of the disc holder 30. A space between these two engaging concave portions 31a and 31b has the same span as that between two mounting pins 32a and 32b inside the receiving portion 29a. Therefore, a plural number of disc holders 30 in engagement with the mounting pins 32a and 32b inside the receiving portion 29a are stacked in sequence.

The disc housing case 28 with an embodiment such as this enables disc holders 30 to be housed in and taken out from the disc housing case 28 without the necessity to remove the mounting pins 32a and 32b from inside the receiving portion 29a, and therefore facilitates the housing and taking out of the disc holders 30. The disc holders 30 inside the receiving portion 29a are able to be turned in much the same way as pages in a book, as in the case for FIG. 7A and FIG. 7B. The necessary disc holder can therefore be selected.

In addition, in the state where the lid 29b is closed, it is not possible for dust to enter into the receiving portion 29a and in addition, since the housing case body is a hard case, the discs 13 are also protected from impact forces applied from outside.

Figure 9B:
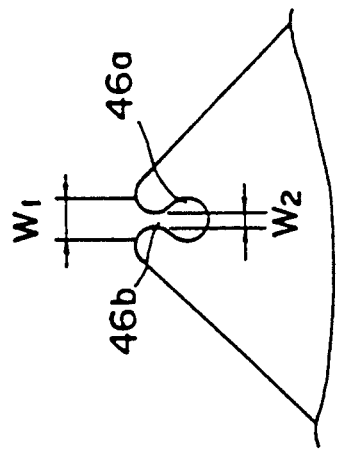
FIG. 9A, FIG. 9B and FIG. 9C are view indicating another embodiment of the disc housing case according to the present invention.
Figure 9C:
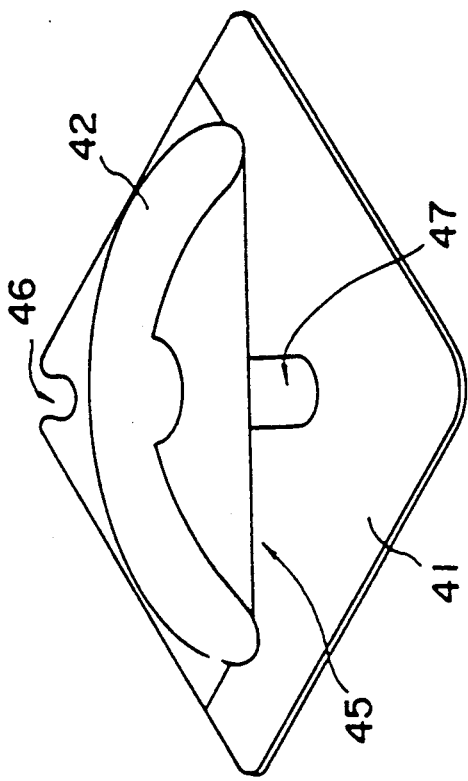
Figure 9A:
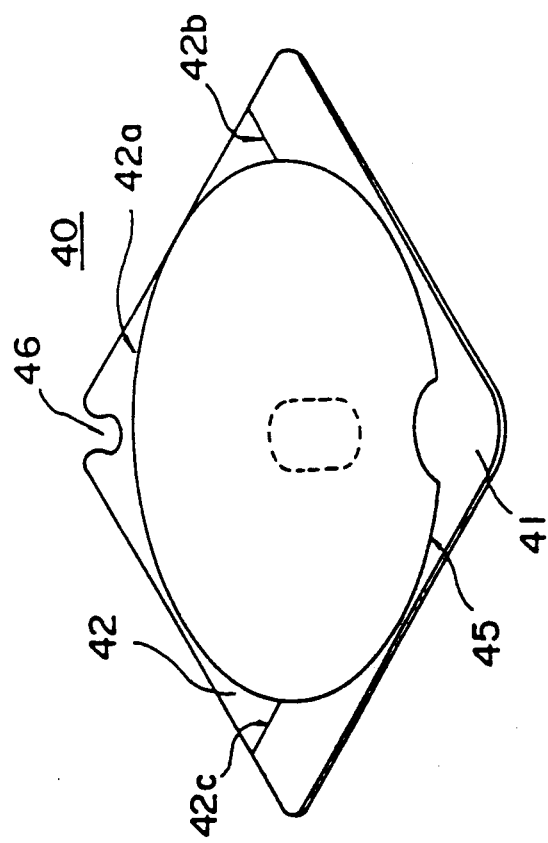

FIG. 9A through FIG. 9C are perspective views indicating another embodiment of a disc holder.

This disc holder 40 includes a thin rectangular-shaped base member 41 formed from the same resin as used for the base member of FIG. 2, and a sheet member 42 formed of the same resin. The sheet member 42 and the base member 41 are joined by thermal adhesion so that there is an opening on the corner opposite the base member 41. The line of this adhesion forms an arc 42a in the center of the space formed by the two lines 42b and 42c of both sides. The arc 42a formed by the adhesion line is in agreement with the outer circumference of a compact disc to be housed, and the base member 41 and the sheet member 42 together form a pocket 45. The opening side of the pocket 45 has a concave engaging portion 46 is configured from a hole 46a and a communicating portion 46b that communicates with this hole 46a and the outside of the base member 41. Thus, the communicating portion 46b has the opening width $W_2$ to the hole 46a less than the opening width $W_1$ to the outside of the base member 41. In addition, as shown in FIG. 9C, the disc holder 40 has a sheet member 42 on the opening side of the pocket and which can be peeled back. An insertion hole 47 for a finger in the pocket 45 of the base member 41. When a finger is inserted through the insertion hole 47 from the underside of the base member 41, the disc 13 inside the pocket 45 can be lifted up, so that the taking out of the disc 13 from the pocket 45 is facilitated.

The disc holder 7 and the disc holders 30 indicated in FIG. 2 and FIG. 8 respectively, can be either flexible or not flexible, but disc holder 40 shown in FIG. 9A through FIG. 9C is of a flexible structure.

FIG. 10A is an exploded perspective view indicating the configuration of the entire disc housing case.

The housing case body housing the disc holders 40 includes an outer case 50 and an inner case 60.

The outer case 50 has a upper plate 51 and a lower plate 52 and a side walls 53 and 54 formed so as to hold and separate the upper plate 51 and the lower plate 52 at a predetermined distance. Moreover, the side wall 54 is not indicated in the figure. The side walls 53 and 54 respectively engage with the corners of the upper plate 51 and the lower plate 52 and as a result of this, the upper plate 51 has a structure whereby each of the side walls 53 and 54 open on opposite sides. At the corners of the upper plate 51 and the lower plate 52 at the ends of the non-engagement end of the side wall 54, are formed stop members 55 and 56 provided with stop holes 55a and 56a.

The inner case 60 has a base plate 61 and two side walls 62 and 63 formed on two sides of the base plate 61. Each of these side walls 62 and 63 are engaged by a corner of the base plate 61. As a result of this, the inner case 60 has a structure whereby the walls opposite the two side walls 62 and 63 are open. A stopper member 64 and a fan-shaped plate 65 are formed at the top portion of the non-engagement end of the side wall 63. The stopper member 64 is provided with a stopper hole 64a. In addition, a corner of the base plate 61 ha a stopper member formed in the same manner opposing the upper stopper member 64. (This is not seen in the figure.) This stopper member formed at the lower portion also has the a stopper member formed at the lower portion also has stopper member 64 of the upper portion. An opposite side of the edge forming the side wall 62 of the base plate 61 is formed with a slider groove 67 and the underside of the stopper member 64 is formed with a slider groove having a structure that is similar with respect the slider groove 67 of the base plate 61. (This is not seen in the figure.)

A mounting pin 68 is provided in the inner case 60. This mounting pin 68 comprises a shaft portion 68a, a upper slider 69 provided at an upper end of the shaft portion 68a and a lower slider 70 provided at a lower end of the shaft portion 68a. The upper slider 69 and the lower slider 70 both have cutout portions 69a and 70a formed in them respectively. Thus, the upper slider 69 engages with the upper slider groove formed on the inner case 60 and the lower slider 70 engages with the lower slider groove 67 formed on the inner case 60, and so as to be freely slidable.

Each of the stopper members 64 of the inner case 60 are sandwiched between each of the stop members 55 and 56 of the outer case 50 and the inner case 60 is inserted into the outer case 50. Then, a stop pin 72a formed in the engagement member 72 is inserted in the stop hole 56a of the stop member of the inner case 60. And a stop pin (not shown in the figure) formed on the other engagement member 71 is inserted in the stop hole 55a of the stop member 55 of the outer case 50 and the stop hole 64a of the stop member 64 of the inner case 60. These engagement members 71 and 72 form a single unit with the outer case 50 and the inner case 60. In this state, the upper and lower slides 69 and 70 of the mounting pin 68 inside the inner case 60 do not contact the stop pin of the upper and lower engagement members 71 and 72 because of the cutout portions 69a and 70a. The inner case 60 which forms a single unit with the outer case 50 is therefore pivotable rotatable around the center of the stop pins 71a and 72a of the upper and lower engagement members 71 and 72. When the inner case 60 is pivoted around the center of the stop pins 71a and 72a of the upper and lower engagement members 71 and 72 and is housed inside the outer case 50, the side walls 62 and 63 of the inner case 60 close the opening portion of the outer case 50 as shown in FIG. 11A, and a housing case body that is airtight overall is formed. Moreover, a hook 62a is formed at the end portion of the side wall 62 of the inner case 60 so that when the inner case 60 is closed, this hook 62a engages with a stopper portion 50a on the side of the outer case 50. Because of this, there is no danger that the inner case 60 will naturally open when the disc housing case is carried.

Figure 11B:
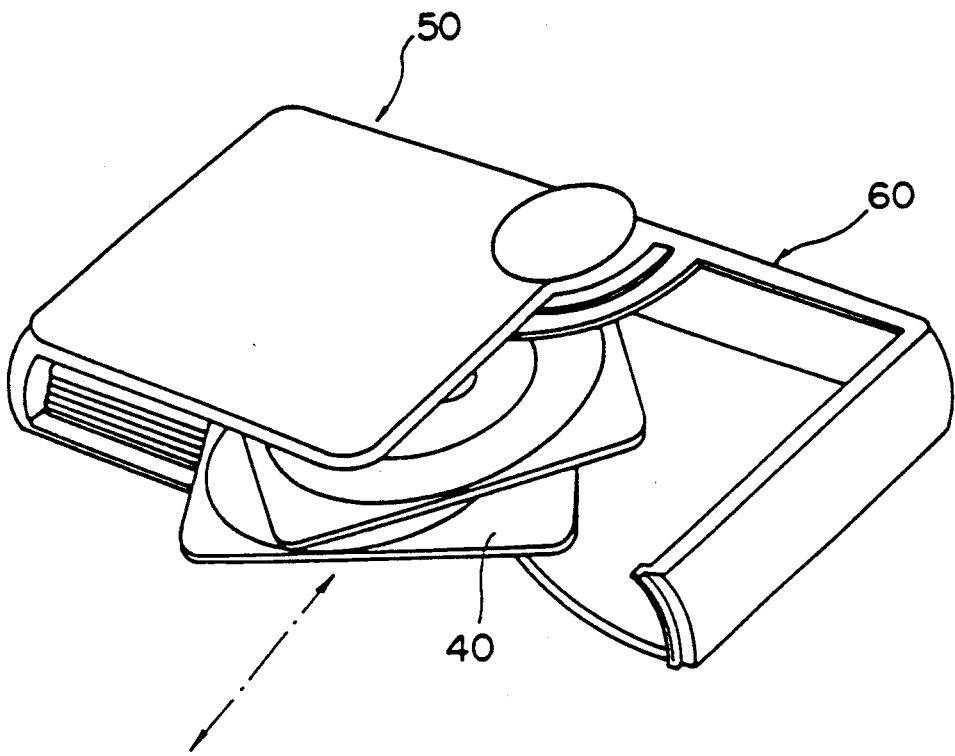
Figure 11C:
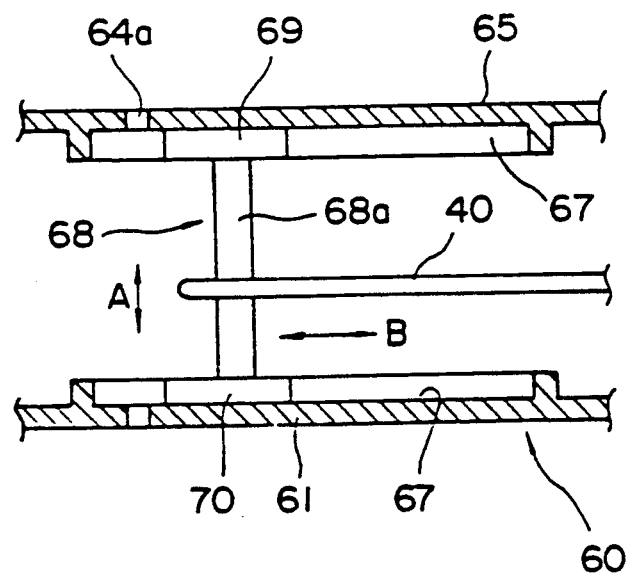
FIG. 11C is a sectional view indicating the engagement status of the mounting pin inside the case.

Furthermore, when the inner case 60 pivots around the center of each of the engagement members 71 and 72 to come out of the outer case 50, the disc holders 40 inside the housing case body are exposed as is shown in FIG. 11B. As shown in FIG. 10, the concave engaging portion 46 of each of the disc holders 40 engages with the shaft portion 68a of the mounting pin 68. And the disc holders 40 are held inside the housing case body. The status of this engaging portion becomes as shown in FIG. 11C and the disc holder 40 is lightly engaged with respect to the shaft portion 68a of the mounting pin 68 so that it is freely movable in the directions of the arrow A. Then, the mounting pin 68 that is in engagement with the disc holder 40 can slide along the slide groove 67 inside the inner case 60 and in the direction the arrow B in FIG. 11C so that the disc holder 40 is able to be taken from and inserted into the housing case body as is shown by the arrow in FIG. 11B. When the disc holder 40 is pulled out, a disc 13 can be housed in or taken out from the housing case. When the disc holder 40 is in the state where it has been pulled out of the housing case, it is possible to house a disc 13 in the disc holder 40 and to take a disc 13 out from the disc holder 40 and so these tasks are facilitated.

The communicating portion 46b of the concave engaging portion 46 formed in the disc holder 40 has a portion of narrow width as is indicated in FIG. 9B. This width is narrower than the width of the shaft portion 68b of the mounting pin 68 inside the housing case body. And the disc holders 40 are flexible. Therefore, when the disc holder 40 is pulled out from the housing case body by a strength smaller than a strength that causes a deformation in the vicinity of the concave engaging portion 46 of the disc holder 40, the concave engaging portion 46 is not detached from the shaft portion 68a of the mounting pin 68 with ease. On the other hand, a strength applied when the disc holder 40 is pulled or pushed, causes a deformation in the vicinity of the concave engaging portion 46 of the disc holder 40 is deformed causes the disc holder 40 to attach and remove with respect to the mounting pin 68.

Moreover, as is indicated in FIG. 11A, this disc housing case has a catch 75 formed in the engaging portions of the outer housing case has a catch 75 formed in the engaging portions of the outer case 50 and inner case 60 and this catch 75 has a belt 80 attached to it to facilitate the carrying of the disc housing case.

The present invention is not limited to the aforementioned embodiments, and variations and modifications may be made without departing from the scope of the invention.

What is claimed is:

1. A disc housing case comprising:
   at least one disc holder, said disc holder including a base member having an engagement portion and flexible sheet forming a pocket together with said base member, said pocket holding an information recording disc inserter therein;
   a housing member; said housing member having an outer case body, an inner case body housing said disc holder and positionable within said outer case body, and a hinge shaft means having an axis of rotation, said outer case body having top and bottom walls, said top and bottom being parallel to but spaced from each other in a direction parallel to said axis of rotation, said outer case body having a pair of side walls joining said top and bottom walls, said side walls being joined at a contiguous edge, said inner case body having top and bottom surfaces spaced from each other in a direction parallel to said axis of rotation, said inner case body having a pair of side walls joining said top and bottom surfaces, said pair of side walls of said inner case body being joined at a contiguous edge, said outer case body and said inner case body rotates around said axis of rotation and can be positioned inside and outside of said outer case body, said side walls of said outer and inner case bodies forming, with said top and bottom walls, an enclosing disc housing case containing said disc holder; and
   a mounting member coupled to said housing member proximate to said hinge shaft means, said mounting member having mounting means extending between said top and bottom surfaces of said inner case body generally parallel to said axis of rotation, said mounting means detachably engaging said engagement portion of said disc holder housed by said housing member such that said disc holder is positioned in said housing member so as to lie transverse to said axis of rotation of said hinge shaft means and so that said disc holder can be detached from said housing member by forces applied to said disc holder.

2. The disc housing case as claimed in claim 1, wherein said mounting member and inner case body are formed such that said mounting member is movable toward and away from said axis of rotation of said hinge shaft means, whereby said disc holder which is engaged with said mounting member can be partially pulled out from said inner case body of said housing member by the movement of said mounting member.

3. The disc housing case as claimed in claim 2, wherein said mounting member and said inner case body have mating slide mechanisms for permitting said mounting member to slidably move toward and away from said axis of rotation.

4. The disc housing case as claimed in claim 1 wherein said pocket is formed by partially affixing an edge portion of said flexible sheet to said base member.

5. The disc housing case as claimed in claim 1 wherein said flexible sheet is partially affixed to said base member so that an affixed portion of said flexible sheet corresponds to a shape of an outer edge of the information recording disc.

6. The disc housing case as claimed in claim 1 wherein said base member has a finger insertion hole through which said pocket is partially exposed.

7. The disc housing case as claimed in claim 1 wherein said base member is polygonal in shape, and said engagement portion of said disc holder is provided at a corner of said base member.

8. The disc housing case as claimed in claim 1 wherein said base member is rectangular in shape, and said pocket has an opening oriented to a first corner of said base member, and wherein said engagement portion is formed at a second corner which is diagonally opposite to said first corner.

9. The disc housing case as claimed in claim 1 wherein said base member is formed of a flexible material.

10. A disc housing case as claimed in claim 8 wherein said engagement portion of said disc holder has an engagement hole portion and a communication portion communicating with said engagement hole portion and with an opening formed in the periphery of said base member, said communication portion having an opening having a width less than a width of said opening.

11. The disc housing case as claimed in claim 1, wherein said pocket of said disc holder has an opening and an engagement portion formed on an outer edge of said base member at a position other than a position which faces said opening of said pocket.

* * * * *